United States Patent
Clarke et al.

(10) Patent No.: US 7,726,567 B2
(45) Date of Patent: Jun. 1, 2010

(54) METHOD AND SYSTEM FOR GENERATING AN ELECTRONIC PRODUCT IDENTIFICATION REPORT IN AN EMBEDDED DEVICE

(75) Inventors: James B. Clarke, Orlando, FL (US); Cynthia Joann Osmon, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 889 days.

(21) Appl. No.: 11/586,753

(22) Filed: Oct. 25, 2006

(65) Prior Publication Data

US 2008/0116275 A1    May 22, 2008

(51) Int. Cl.
*G06F 17/00* (2006.01)
*G06K 7/08* (2006.01)

(52) U.S. Cl. ......................... 235/451; 235/375; 705/22; 705/27

(58) Field of Classification Search .................. 235/451, 235/375, 380, 382, 383, 492; 705/22, 26, 705/37, 28, 27
See application file for complete search history.

(56) References Cited

U.S. PATENT DOCUMENTS

| | | | |
|---|---|---|---|
| 5,446,885 A * | 8/1995 | Moore et al. | 707/103 R |
| 7,092,914 B1 * | 8/2006 | Shear et al. | 705/67 |
| 2003/0216969 A1 * | 11/2003 | Bauer et al. | 705/22 |
| 2004/0111327 A1 * | 6/2004 | Kidd et al. | 705/26 |
| 2004/0133671 A1 * | 7/2004 | Taniguchi | 709/224 |
| 2005/0131800 A1 * | 6/2005 | Parks et al. | 705/37 |
| 2007/0136148 A1 * | 6/2007 | Stremler et al. | 705/27 |
| 2007/0198372 A1 * | 8/2007 | Stremler et al. | 705/27 |
| 2008/0115958 A1 * | 5/2008 | Stutzman et al. | 174/113 C |
| 2008/0116275 A1 * | 5/2008 | Clarke et al. | 235/451 |
| 2008/0289005 A1 * | 11/2008 | Skowron et al. | 726/3 |
| 2008/0294555 A1 * | 11/2008 | Bromma | 705/43 |

OTHER PUBLICATIONS

EPCglobal™, "The Application Level Events (ALE) Specification, Version 1.0", EPCglobal Ratified Specification, Version of Sep. 15, 2005, 71 pages.

* cited by examiner

*Primary Examiner*—Thien M Le
(74) *Attorney, Agent, or Firm*—Osha • Liang LLP

(57) ABSTRACT

An embedded device includes a web interface configured to receive a request for an electronic product information (EPID) report, and send the request to a request handling service. The embedded device further includes the request handling service, configured to deploy one or more event handling components based on the request. The embedded device further includes the one or more event handling components configured to generate an EPID event cycle based on an EPID read cycle, according to an event cycle boundary condition, generate the EPID report based on the EPID event cycle, and transmit the EPID report to a client. The embedded device further includes a reader adapter configured to obtain the EPID read cycle, and transmit the EPID read cycle to the one or more event handling components.

20 Claims, 6 Drawing Sheets

METHOD AND SYSTEM FOR GENERATING AN ELECTRONIC PRODUCT IDENTIFICATION REPORT IN AN EMBEDDED DEVICE

BACKGROUND

Technologies currently exist for identifying products (i.e., physical items) electronically, using electronic identification transmissions generated by transmitters associated with the products. Identifying products electronically may be useful in a variety of situations. For example, electronic product identification may be useful for tracking the location of a product, managing product inventory, etc. Further, in some situations, it may be useful to generate an electronic product identification (EPID) report, i.e., a report providing information about products that have been electronically identified.

SUMMARY

In general, in one aspect, the invention relates to an embedded device. The embedded device comprises a web interface configured to receive a request for an electronic product information (EPID) report, and send the request to a request handling service. The embedded device further comprises the request handling service, configured to deploy at least one event handling component based on the request. The embedded device further comprises the at least one event handling component configured to generate an EPID event cycle based on an EPID read cycle, according to an event cycle boundary condition, generate the EPID report based on the EPID event cycle, and transmit the EPID report to a client. The embedded device further comprises a reader adapter configured to obtain the EPID read cycle, and transmit the EPID read cycle to the at least one event handling component.

In general, in one aspect, the invention relates to a system. The system comprises a client configured to generate a request for an electronic product identification (EPID) report. The system further comprises an embedded device. The embedded device comprises a web interface configured to receive the request, and send the request to a request handling service. The embedded device further comprises the request handling service, configured to deploy at least one event handling component based on the request. The embedded device further comprises the at least one event handling component configured to generate an EPID event cycle based on an EPID read cycle, according to an event cycle boundary condition, generate the EPID report based on the EPID event cycle, and transmit the EPID report to the client. The embedded device further comprises a reader adapter configured to obtain the EPID read cycle, and transmit the EPID read cycle to the at least one event handling component.

In general, in one aspect, the invention relates to a computer readable medium. The computer readable medium comprises executable instructions for generating an electronic product identification (EPID) report by broadcasting availability of an embedded device to obtain an external management message, wherein the external management message is transmitted by a management console based on the broadcasted availability, obtaining the external management message, by the embedded device, receiving a request for the EPID report, by a web interface in the embedded device, wherein the request conforms to Application Level Events (ALE) specification, sending the request to a request handling service in the embedded device, deploying at least one event handling component in the embedded device, by the request handling service, obtaining an EPID read cycle comprising (RFID) data, by a reader adapter in the embedded device, generating an EPID event cycle based on the EPID read cycle, according to an event cycle boundary condition, wherein the event cycle boundary condition comprises a condition selected from a group consisting of a time interval grouping, an elapsed time period, an external event trigger, and only detecting repeated EPIDs in a specified time period, generating the EPID report based on the EPID event cycle, by the at least one event handling component, and transmitting the EPID report to a client, wherein at least one selected from a group consisting of generating the EPID event cycle, generating the EPID report, and transmitting the EPID report is performed based on the external management message.

Other aspects of the invention will be apparent from the following description and the appended claims.

DETAILED DESCRIPTION

Figure 1:
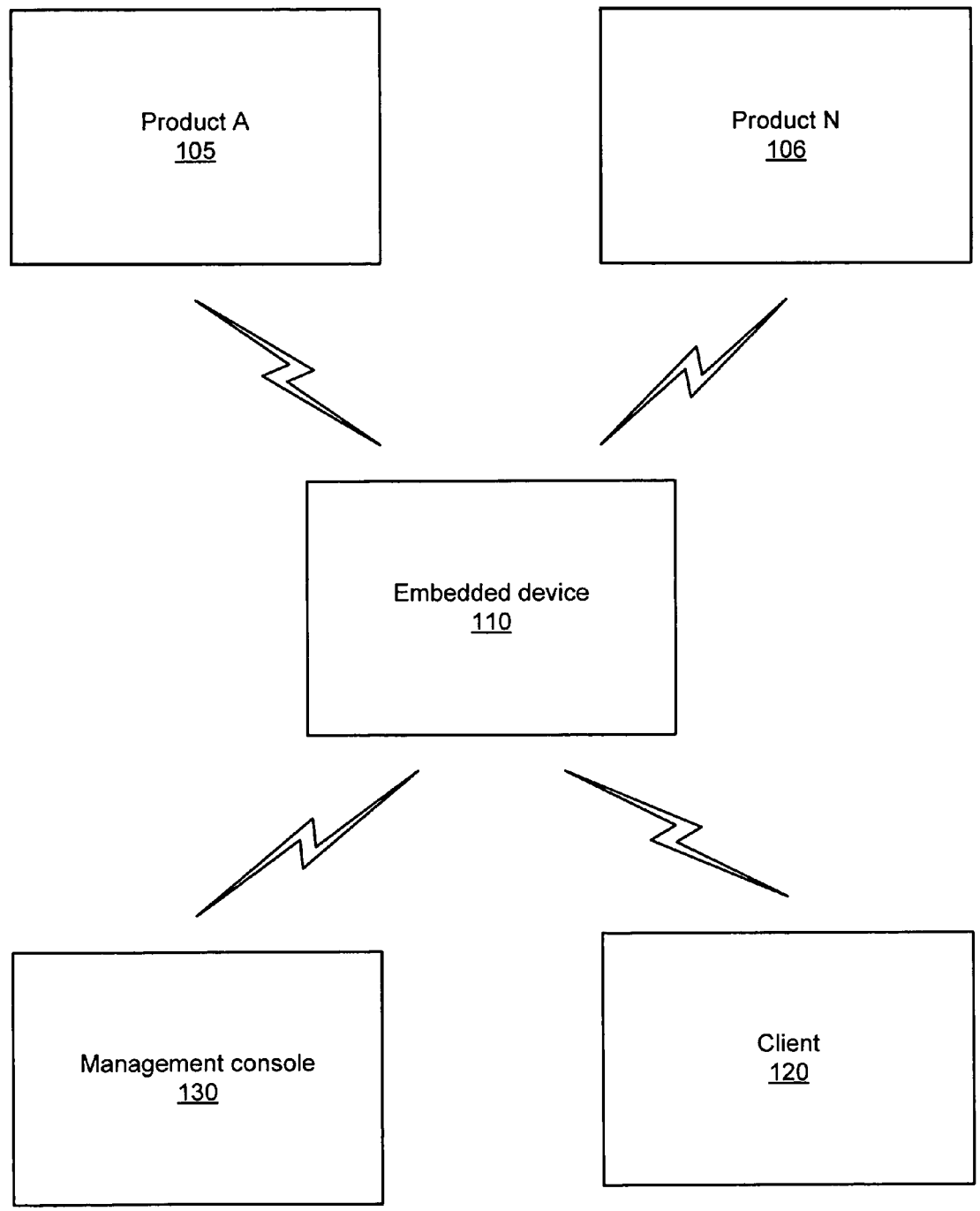
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to generate an electronic product identification (EPID) report in an embedded device. Specifically, a web interface in the embedded device receives a request for the EPID report and forwards the request to a request handling service. Based on the request, the request handling service deploys one or more event handling components. A reader adapter in the embedded device obtains an EPID read cycle, and transmits the EPID read cycle to the event handling component(s). The event handling component(s) subsequently generate an EPID event cycle based on the EPID read cycle, generate a report based on the EPID event cycle, and transmit the EPID report to a client.

One or more elements of the invention described herein may be based on an EPGglobal Inc's Application Level Events (ALE) specification. For example, one such specification is described in The Application Level Events (ALE) Specification, Version 1.0, EPC Global Ratified Specification Version of Sep. 15, 2005, the entire contents of which are incorporated herein by reference.

FIG. 1 shows a diagram of a system in accordance with one or more embodiments of the invention. Specifically, FIG. 1 shows a diagram of one or more products (e.g., product A (105), product N (106)), an embedded device (110), a client (120), and a management console (130) in accordance with one or more embodiments of the invention.

In one or more embodiments of the invention, a product (e.g., 105, 106) may be any type of physical item configured to transmit electronic identification information. Specifically, in one or more embodiments of the invention, the electronic identification information may be transmitted by a transmitter (not shown) integrated with the product, coupled with the product, contained within the product, or any combination thereof. Such transmissions may be referred to as electronic identification transmissions. Specifically, the electronic identification transmissions may be used to uniquely identify an individual product, group of products, and/or class of products. In one or more embodiments of the invention, the transmitter may be a radio frequency identification (RFID) transmitter, a Bluetooth® transmitter, an IEEE 802.11™ transmitter, an infrared transmitter, or any other similar type of transmitter. Bluetooth® is a registered trademark of the Bluetooth Special Interest Group (SIG). IEEE 802.11™ is a trademark of the Institute of Electrical and Electronics Engineers, Inc.

In general terms, an embedded device (e.g., 110) is a device in which a computer system is physically embedded to control functionality of the device. Specifically, an embedded device (e.g., 110) physically contains most or all of the computing components (i.e., hardware and/or software) needed to achieve its designated purpose. Said another way, computer systems in embedded devices (e.g., 110) are not used for general-purpose computing, and are therefore distinguished from standard computer systems by degrees of specialization and integration. Accordingly, the embedded device (110) includes one or more specialized hardware and/or software components. Examples of embedded devices include automated teller machines (ATMs), mobile phones, routers, printers, computerized thermostats, calculators, microwave ovens, digital video disc (DVD) players, personal digital assistants (PDAs), video game consoles, etc.

More specifically, in one or more embodiments of the invention, the embedded device (110) may include hardware and/or software components specialized for performing EPID-related tasks. In particular, in one or more embodiments of the invention, the embedded device (110) may be configured to obtain one or more transmissions from one or more products (e.g., 105, 106) and generate an EPID report based on the transmission(s). Generation of an EPID report based on product transmissions is discussed below. In one or more embodiments of the invention, using an embedded device to perform EPID-related tasks may reduce the complexity of an EPID system and/or may improve performance of the system by reducing the need for communication with other components in the system (not shown).

In one or more embodiments of the invention, the embedded device (110) may be further configured to receive a request for an EPID report from a client (120). Specifically, in one or more embodiments of the invention, the embedded device (110) may be configured to generate the EPID report and transmit the EPID report to the client (120) in response to the request. In one or more embodiments of the invention, the client (120) may be any hardware and/or software device configured to transmit a request for an EPID report to the embedded device (110). For example, the client (120) may be a server, another type of embedded device, or any other similar type of hardware and/or software device. Further, in one or more embodiments of the invention, the embedded device (110) and the client (120) may communicate via a wired connection (e.g., a telephone line, a digital signal 1 (DS1) line, a registered jack 45 (RJ45) cable, a universal serial bus (USB) cable, etc.), a wireless connection (e.g., Bluetooth®, IEEE 802.11™, infrared, etc.), or any combination thereof.

In one or more embodiments of the invention, the embedded device (110) may be further configured to obtain an external management message from a management console (130). Specifically, in one or more embodiments of the invention, the embedded device (110) may be configured to perform EPID-related tasks based on the external management message. In one or more embodiments of the invention, the management console (130) may be any hardware and/or software device configured to transmit an external management message to the embedded device (110). For example, the management console (130) may be a server, another type of embedded device, or any other similar type of hardware and/or software device. Further, in one or more embodiments of the invention, the embedded device (110) and the management console (130) may communicate via a wired connection (e.g., a telephone line, a digital signal 1 (DS1) line, a registered jack 45 (RJ45) cable, a universal serial bus (USB) cable, etc.), a wireless connection (e.g., Bluetooth® transmitter, an IEEE 802.11™, infrared, etc.), or any combination thereof. As discussed above, in one or more embodiments of the invention, the embedded device (110) may include one or more specialized hardware and/or software components.

Figure 2:
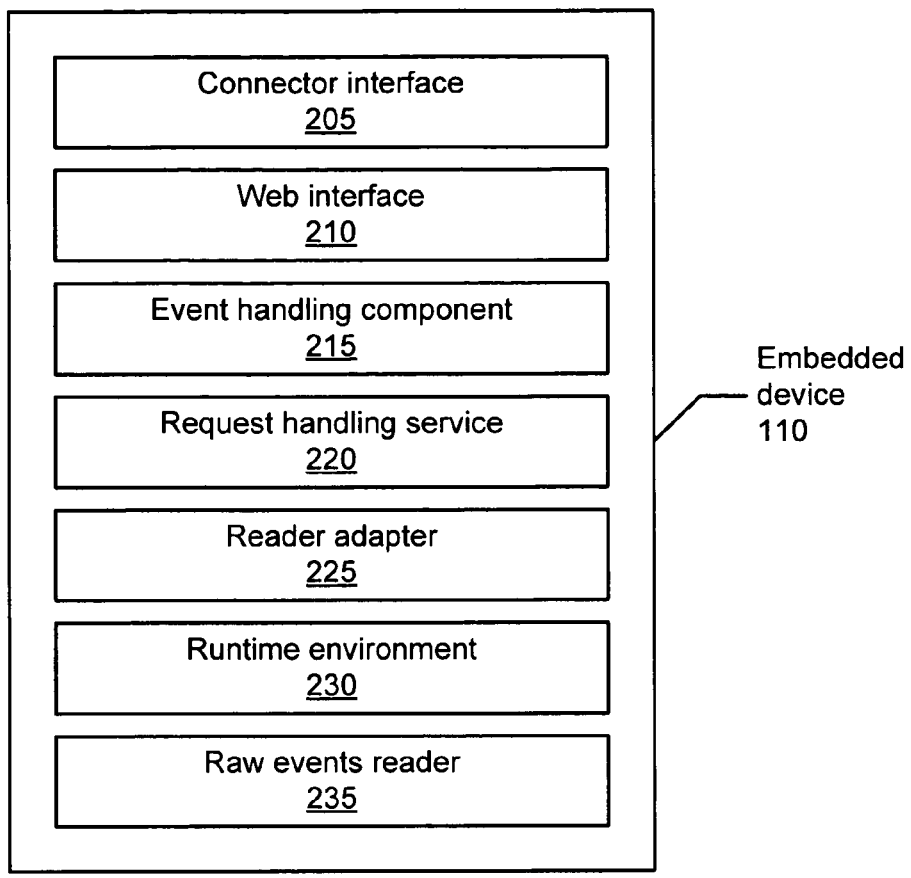
FIG. 2 shows a diagram of an embedded device in accordance with one or more embodiments of the invention.

FIG. 2 shows a diagram of the embedded device (110) in accordance with one or more embodiments of the invention. In one or more embodiments of the invention, the embedded device (110) may include a web interface (210) configured to receive a request for an EPID report. In one or more embodiments of the invention, the web interface (210) may be any type of interface configured to receive the request for the EPID report via a network connection (i.e., a wired and/or wireless network connection), in a predefined format. For example, the web interface (210) may be a Microsoft® .NET interface, a PHP: Hypertext Preprocessor (PHP) interface, a ColdFusion™ interface, a Java™ servlet interface, or any other similar type of web interface. Microsoft® is a registered trademark of Microsoft, Inc, ColdFusion™ is a registered trademark of MacroMedia, Inc, and Java™ is a trademark of Sun Microsystems, Inc. In one or more embodiments of the invention, using a web interface (210) to receive requests for EPID reports may increase the number of client devices that are able to make such requests.

More specifically, in one or more embodiments of the invention, the web interface (210) may be a Java™ servlet operating on a Java™ web server (e.g., Jetty or any other similar type of Java™ web server). In one or more embodiments of the invention, the predefined format in which the request is received may be an extensible markup language (XML) format, a hypertext markup language (HTML) format, a remote procedure call (RPC) format, or any other similar type of format. Further, in one or more embodiments of the invention, the request may conform to the ALE specification. In one or more embodiments of the invention, conforming to a specification may facilitate interoperability of the embedded device with a variety of clients, as long as the clients also conform to the same specification.

Further, in one or more embodiments of the invention, the web interface (210) may be configured to send the request to a request handling service (220) in the embedded device (110). As discussed above, in one or more embodiments of the invention, the request for the EPID report may be received in a predefined format. In one or more embodiments of the invention, if the request is received in an XML format, the request handling service (220) may be configured to parse the request using an XML parser (not shown). For example, the XML parser may be the open source XML parser kXML, which is a small XML pull parser specifically designed for constrained operating environments.

Further, in one or more embodiments of the invention, the request handling service (220) may be configured to deploy one or more event handling components (e.g., event handling component (215)) in the embedded device (110) based on the request obtained from the web interface (210). The event handling component(s) (e.g., event handling component (215)) are discussed below. Specifically, in one or more embodiments of the invention, the request handling service (220) may be configured to interpret the request based on a predetermined request specification (e.g., according to an Application Level Events (ALE) specification or any other similar type of specification) to determine which event handling component(s) (e.g., event handling component (215)) and/or which configuration(s) thereof to deploy. In one or more embodiments of the invention, the request handling service (220) may be any type of hardware and/or software module configured to deploy the event handling component(s) (e.g., event handling component (215)) based on the request.

In one or more embodiments of the invention, the embedded device (110) may include a raw events reader (235) configured to obtain raw events (i.e., one or more electronic identification transmissions) from one or more products (e.g., 105, 106 of FIG. 1). For example, the raw events reader (235) may be a laser scanner, an infrared receiver, an IEEE 802.11™ interface, a radio frequency identification (RFID) receiver, or any other similar type of reader for obtaining electronic identification transmissions. A grouping of one or more raw events is referred to hereinafter as an EPID read cycle.

Further, in one or more embodiments of the invention, the embedded device (110) may include a reader adapter (225) configured to obtain one or more EPID read cycles from the raw events reader (235). Specifically, in one or more embodiments of the invention, the reader adapter (225) may be configured to translate the EPID read cycle(s) into a format useable by the event handling component(s) (e.g., event handling component (215)). For example, the reader adapter (225) may be a Java™ Native Interface (JNI) wrapper configured to obtain the EPID read cycle(s), instantiate one or more Java™ objects representing the EPID read cycle(s), and transmit the object(s) to the event handling component(s) (e.g., event handling component (215)) via a Java™ Application Program Interface (API). Alternatively, in one or more embodiments of the invention, the reader adapter (225) may be configured to obtain raw events directly in the format required by the event handling component(s) (e.g., event handling component (215)). Said another way, the raw events obtained by the reader adapter (225) may already be in the format required by the event handling component(s) (e.g., event handling component (215)), and therefore may not require translation prior to being submitted to the event handling component(s) (e.g., event handling component (215)).

In one or more embodiments of the invention, the event handling component(s) (e.g., event handling component (215)) may be configured to generate one or more EPID event cycles based on the EPID read cycle(s) received from the reader adapter (225). Specifically, an EPID event cycle is the result of filtering and/or consolidating one or more EPID read cycles according to an event cycle boundary condition. More specifically, the event cycle boundary condition may include one or more of the following: grouping read cycles received in a given time interval (e.g., in a two second interval, a one minute interval, etc.), grouping read cycles after an elapsed time period (e.g., every minute, every half hour, etc.), delimiting an event cycle based on one or more external event triggers (e.g., a sensor signal associated with a conveyor belt), and/or delimiting an event cycle if only repeated EPIDs are detected in a specified time period (i.e., if all EPID transmissions obtained in the specified time period are for products that have already been detected), any other similar type of event cycle boundary condition, or any combination thereof. Further, in one or more embodiments of the invention, the EPID event cycle(s) may be generated according to the ALE specification or any other similar type of specification.

As discussed above, in one or more embodiments of the invention, the embedded device (110) may be configured to communicate with a management console (i.e., 130 of FIG. 1). Accordingly, in one or more embodiments of the invention, the embedded device (110) may include a connector interface (205) consisting of elements necessary for communication with the management console. The connector interface (205) is discussed below with respect to FIG. 3.

In one or more embodiments of the invention, the embedded device (110) may include a runtime environment (230) configured to execute software modules in the embedded device (110). Specifically, in one or more embodiments of the invention, the runtime environment (230) may be a virtual machine configured to execute source code compiled into an intermediate language. More specifically, a virtual machine generally provides a layer of abstraction for the underlying operating system and/or hardware, which may allow source code compiled into the intermediate language to execute in any environment where the virtual machine is implemented. For example, the runtime environment (230) may be a Java™ Micro Edition (JME) virtual machine, a Microsoft® .NET common language runtime (CLR), or any other similar type of virtual machine.

More specifically, in one or more embodiments of the invention, one or more components of the embedded device (110) discussed above (i.e., connector interface (205), web interface (210), event handling component(s) (e.g., event handling component (215)), request handling service (220), and/or reader adapter (225)) may be implemented in source code compiled into an intermediate language for execution by the runtime environment (230). For example, if the runtime environment (230) is a JME virtual machine, one or more of the aforementioned components may be JME classes (i.e., stand-alone classes and/or classes grouped in one or more Java™ packages). In one or more embodiments of the invention, use of a runtime environment (230) may allow for a common set of EPID-related task logic to be executed on a variety of embedded devices, as long as the embedded devices implement the same runtime environment (230).

As discussed above, in one or more embodiments of the invention, the embedded device (110) may include a connector interface (205) for communicating with a management console.

Figure 3:
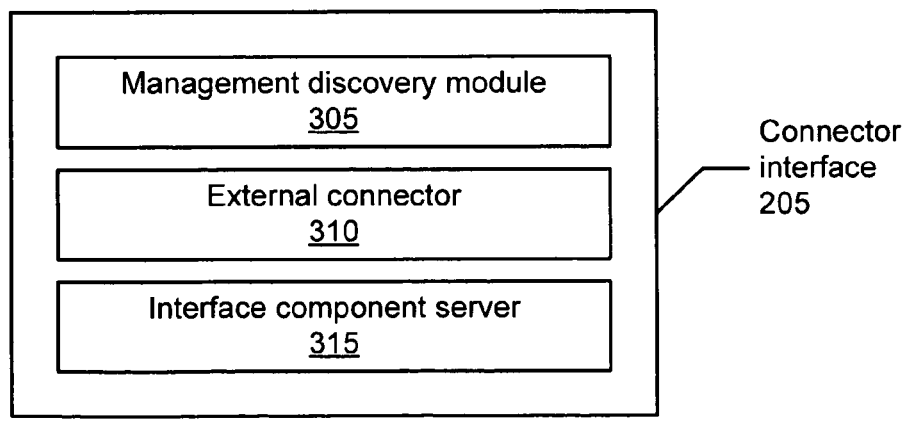
FIG. 3 shows a diagram of a connector interface in accordance with one or more embodiments of the invention.

FIG. 3 shows a diagram of a connector interface (205) in accordance with one or more embodiments of the invention. In one or more embodiments of the invention, the connector interface (205) may include a management discovery module (305) configured to broadcast availability of the embedded device (i.e., 110 of FIG. 1) for management, i.e., availability of the embedded device to obtain an external management message from a management console (i.e., 130 of FIG. 1). In one or more embodiments of the invention, broadcasting availability of the embedded device for management may involve broadcasting a signal (e.g., a wireless network signal and/or a wired network signal) including identifying information about the embedded device. For example, the signal may include an Internet protocol (IP) address (e.g., an IPv4 address, an IPv6 address, etc.) of the embedded device, a media access control (MAC) address of the embedded device, a device name for the embedded device, a device type of the embedded device, any other similar type of identifying information, or any combination thereof.

More specifically, in one or more embodiments of the invention, the management discovery module (305) may be a Java™ Dynamic Management Kit (JDMK) discovery responder configured to broadcast availability of the embedded device for management in response to a multicast discovery request issued by a JDMK discovery client associated with the management console. JDMK is a Java™-based toolkit that allows developers to rapidly create smart agents based on the Java™ Management Extensions (JMX) specification. JMX is a Java™-based technology for building distributed, web-based, modular and dynamic solutions for managing and monitoring devices, applications, and service-driven networks. In one or more embodiments of the invention, including a management discovery module (305) in the embedded device may facilitate connectivity between the embedded device and the management console.

In one or more embodiments of the invention, the connector interface (205) may include an external connector (310) configured to provide a communications interface between the embedded device and the management console. Specifically, in one or more embodiments of the invention, the communications interface provided by the external connector (310) may be a hypertext transfer protocol (HTTP) interface, a Java™ Message Service (JMS) interface, a Transmission Control Protocol (TCP) socket interface, a remote file access interface, or any other similar type of communications interface. For example, the external connector (310) may include a JMX interface providing access for the management console to manage and/or monitor the embedded device. More specifically, in one or more embodiments of the invention, the external connector (310) may be a JMX Messaging Protocol (JMXMP) connector.

In one or more embodiments of the invention, the connector interface (305) may include an interface component server (315) configured to provide execution support for the management discovery module (305) and/or external connector (310). For example, the management discovery module (305) and/or external connector (310) may be Java™ Managed Bean (MBean) components, and the interface component server (315) may be a Java™ MBean server providing access to the Java™ MBean component(s). MBeans are Java™ objects that represent manageable resources, such as applications, services, components, devices, etc.

Figure 4:
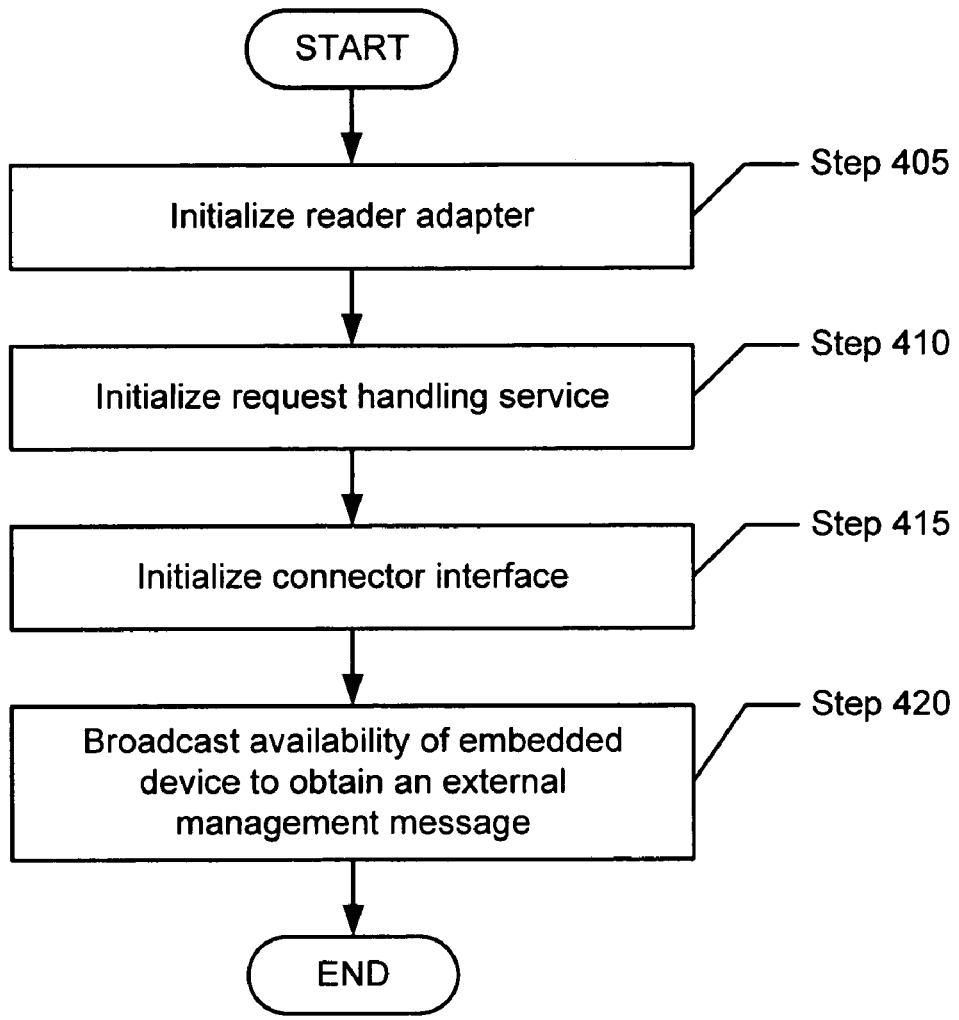
FIGS. 4-6 show a flowchart in accordance with one or more embodiments of the invention.

FIG. 4 shows a flowchart in accordance with one or more embodiments of the invention. Specifically, FIG. 4 shows a flowchart of a method for initializing an embedded device (e.g., embedded device (110) of FIG. 1) in accordance with one or more embodiments of the invention. In one or more embodiments of the invention, one or more of the steps described below may be omitted, may be repeated, and/or may be performed in a different order than the order shown in FIG. 4. Accordingly, the specific arrangement of steps shown in FIG. 4 should not be construed as limiting the scope of the invention.

In one or more embodiments of the invention, in Step 405, a reader adapter may be initialized in the embedded device. In one or more embodiments of the invention, initializing the reader adapter may involve instantiating a software component, configuring a software component according to a configuration file, transmitting power to an electrical component (e.g., to a raw events reader), any other similar type of initialization action, or any combination thereof.

Specifically, in one or more embodiments of the invention, the reader adapter may be initialized using initialization parameters stored in a reader.properties file or any other similar type of file. For example, the reader.properties file may indicate whether a raw events reader in the embedded device supports Java™ loopback functionality. If the raw events reader supports Java™ loopback functionality, then the reader adapter may be initialized using standard Java™ components (e.g., JNI components as discussed above). Alternatively, if the raw events reader does not support Java™ loopback functionality, then the reader adapter may be initialized using components that interface natively with the raw events reader. In one or more embodiments of the invention, the reader adapter may be initialized via a web interface executing in the embedded device. For example, the reader adapter may be initialized when a request for an EPID report is received via the web interface (e.g., the first request that is received after the embedded device is powered on).

In one or more embodiments of the invention, in Step 410, a request handling service may be initialized in the embedded device. In one or more embodiments of the invention, initializing the request handling service may involve instantiating a software component, configuring a software component according to a configuration file, transmitting power to an electrical component, any other similar type of initialization action, or any combination thereof. Further, in one or more embodiments of the invention, the request handling service may be initialized via a web interface executing in the embedded device.

In one or more embodiments of the invention, in Step 415, a connector interface may be initialized in the embedded device. In one or more embodiments of the invention, initializing the connector interface may involve instantiating a software component, configuring a software component according to a configuration file, transmitting power to an electrical component, any other similar type of initialization action, or any combination thereof. For example, if the connector interface includes an interface component server, initializing the connector interface may involve instantiating the interface component server. Further, initializing the connector interface may involve instantiating a client discovery module and/or instantiating an external connector.

In one or more embodiments of the invention, in Step 420, availability of the embedded device for management (i.e., availability to obtain an external management message) may be broadcasted. In one or more embodiments of the invention, broadcasting availability of the embedded device for management may involve broadcasting or multicasting information about the embedded device across a network (i.e., a wired and/or wireless network). Alternatively, in one or more embodiments of the invention, broadcasting availability of the embedded device for management may involve issuing a response to a discovery request from a management console. For example, as discussed above, the embedded device may include the JDMK discovery responder configured to broadcast availability of the embedded device for management in response to a multicast discovery request issued by a JDMK discovery client.

Figure 5:
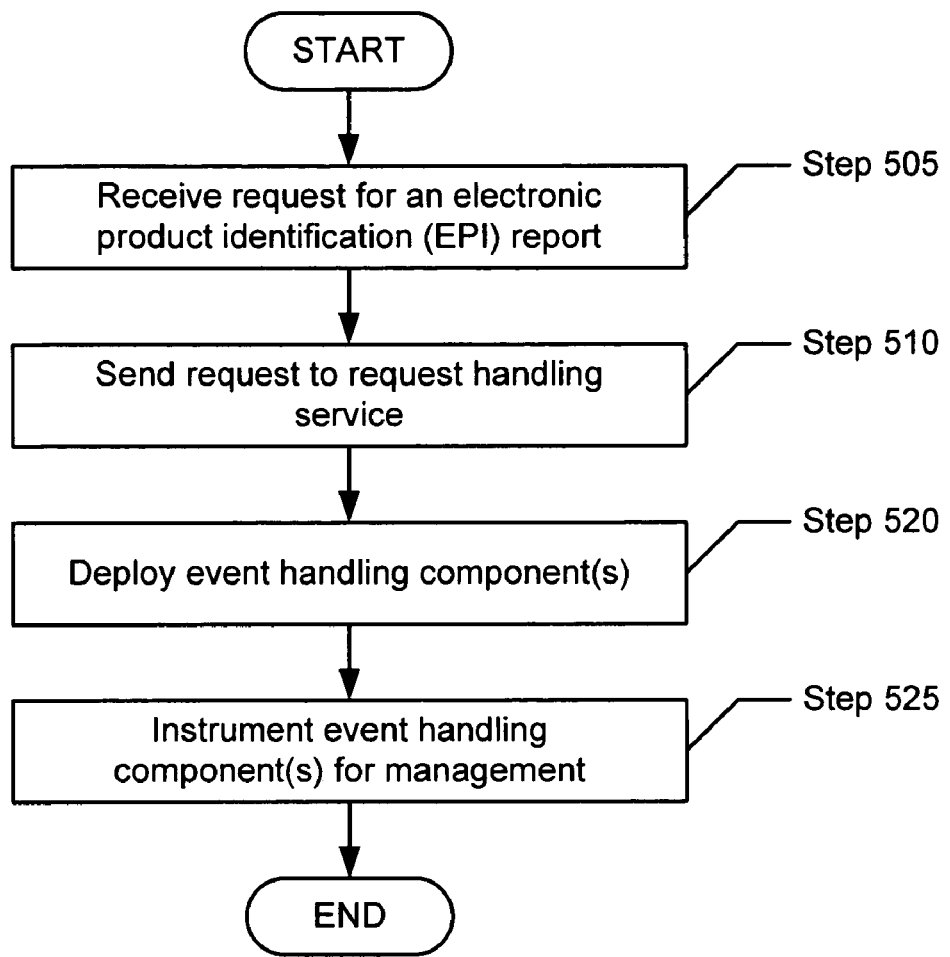

FIG. 5 shows a flowchart in accordance with one or more embodiments of the invention. Specifically, FIG. 5 shows a flowchart of a method for handling a request for an electronic product identification (EPID) report in accordance with one or more embodiments of the invention. In one or more embodiments of the invention, one or more of the steps described below may be omitted, may be repeated, and/or may be performed in a different order than the order shown in FIG. 5. Accordingly, the specific arrangement of steps shown in FIG. 5 should not be construed as limiting the scope of the invention.

In one or more embodiments of the invention, in Step 505, a request for an EPID report may be received. Specifically, as described above, the request may be received, directly or indirectly, from a client by a web interface in an embedded device. In one or more embodiments of the invention, the request may conform to an Application Level Events (ALE) specification. More specifically, in one or more embodiments of the invention, the request may indicate which product information to include in the EPID report, a format for the EPID report (e.g., a list, grouped lists, counts, etc.), one or more event cycle boundary conditions to use to generate the EPID report, any other similar type of request criterion, or any combination thereof. In one or more embodiments of the invention, the request may include a uniform resource locator (URL) of the client, to which the EPID report should be sent.

In one or more embodiments of the invention, in Step 510, the request may be sent to a request handling service in the embedded device. In one or more embodiments of the invention, in Step 520, one or more event handling components may be deployed. Specifically, as described above, the event handling component(s) may be deployed by a request handling service executing in an embedded device, based on one or more aspects of the request. For example, the specific event handling component(s) deployed may depend on the requested format of the EPID report, an event cycle boundary condition indicated by the request, any other similar type of request criterion, or any combination thereof. More specifically, in one or more embodiments of the invention, the event handling component(s) may include an AleEventFilter object for filtering EPID read cycles into EPID event cycles and/or an AleEventReportFilter object for creating an EPID report based on the EPID event cycles.

In one or more embodiments of the invention, in Step 525, the event handling component(s) may be instrumented for management. Said another way, the event handling component(s) may be programmatically configured to handle management instructions from a management console. For example, in a Java™-based implementation, the event handling component(s) may be instrumented for management via Java™ Management Extensions (JMX). In one or more embodiments of the invention, instrumenting the event handler(s) for management may enable remote configuration and/or adjustment of the embedded device, thereby facilitating operation of the embedded device.

Figure 6:
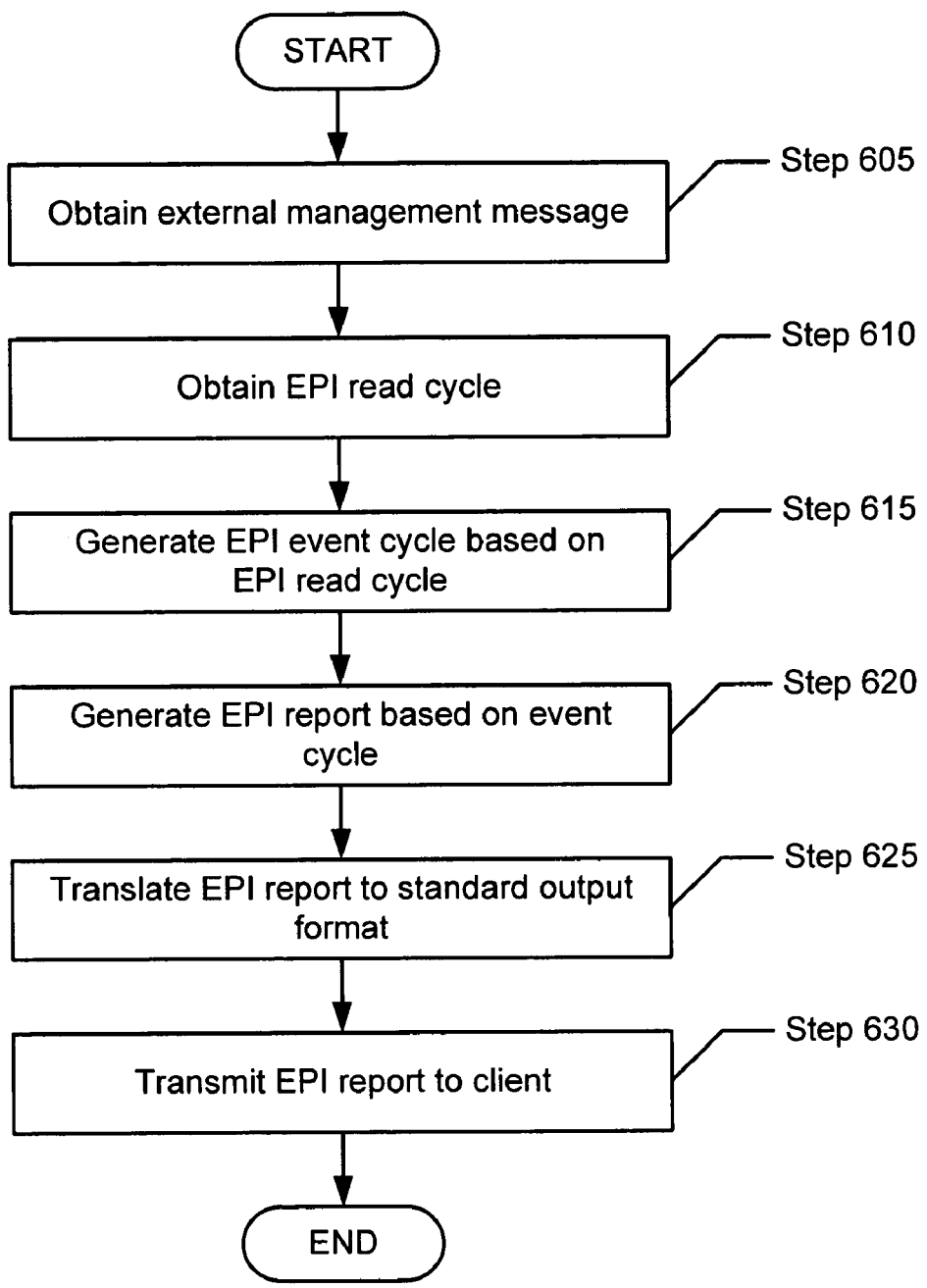

FIG. 6 shows a flowchart in accordance with one or more embodiments of the invention. Specifically, FIG. 6 shows a flowchart of a method for generating an electronic product identification (EPID) report in accordance with one or more embodiments of the invention. In one or more embodiments of the invention, one or more of the steps described below may be omitted, may be repeated, and/or may be performed in a different order than the order shown in FIG. 6. Accordingly, the specific arrangement of steps shown in FIG. 6 should not be construed as limiting the scope of the invention.

In one or more embodiments of the invention, in Step 605, an external management message may be obtained. Specifically, as described above, the external management message may be obtained from a management console by an embedded device. In one or more embodiments of the invention, the external management message may include instructions for managing the embedded device itself and/or event handling component(s) executing in the embedded device. For example, the external management message may be used to determine a connection status of the embedded device (i.e., whether or not the embedded device is connected to a network), to control hardware associated with the embedded device (e.g., radiating power for an antenna, product scan frequency, etc.), to read and/or modify operating parameters of the event handling component(s) (e.g., EPID event cycle status, a listing of electronic identification transmissions received, etc.) or any other similar type of management action.

In one or more embodiments of the invention, in Step 610, an EPID read cycle may be obtained. Specifically, as described above, the EPID read cycle may be obtained from a raw events reader associated with the embedded device. Further, in one or more embodiments of the invention, the EPID read cycle may be obtained via a reader adapter. Said another way, in one or more embodiments of the invention, obtaining the EPID read cycle may involve translating raw events to a format useable by components of the embedded device.

In one or more embodiments of the invention, in Step 615, an EPID event cycle may be generated based on the EPID read cycle. Specifically, the EPID event cycle may be generated by one or more event handlers executing in the embedded device (e.g., event handler(s) deployed in Step 520 of FIG. 5). In one or more embodiments of the invention, as described above, the specific EPID event cycle generated may be based, in part, on an external management message.

In one or more embodiments of the invention, in Step 620, an EPID report may be generated based on the EPID event cycle. Specifically, the EPID report may be generated by one or more event handlers executing in the embedded device (e.g., event handler(s) deployed in Step 520 of FIG. 5). In one or more embodiments of the invention, as described above, the specific EPID report generated may be based, in part, on an external management message.

In one or more embodiments of the invention, an EPID report generated in Step 620 may not be in a format readable by a client that requested the EPID report. Accordingly, in one or more embodiments of the invention, in Step 625, the EPID report may be translated to a standard output format. Specifically, in one or more embodiments of the invention, the EPID report may be translated to an extensible markup language (XML) format conforming to the ALE Specification.

In one or more embodiments of the invention, in Step 630, the EPID report may be transmitted to a client. Specifically, in one or more embodiments of the invention, the EPID report may be transmitted to a client that requested the EPID report. For example, if the request includes a uniform resource locator (URL) for the client, transmitting the EPID report to the client may involve sending the EPID report to the specified URL.

One or more embodiments of the invention provide a means to generate an EPID report in an embedded device. Accordingly, one or more embodiments of the invention may reduce network overhead, may reduce system complexity, and/or may allow for efficient management of the embedded device.

Figure 7:
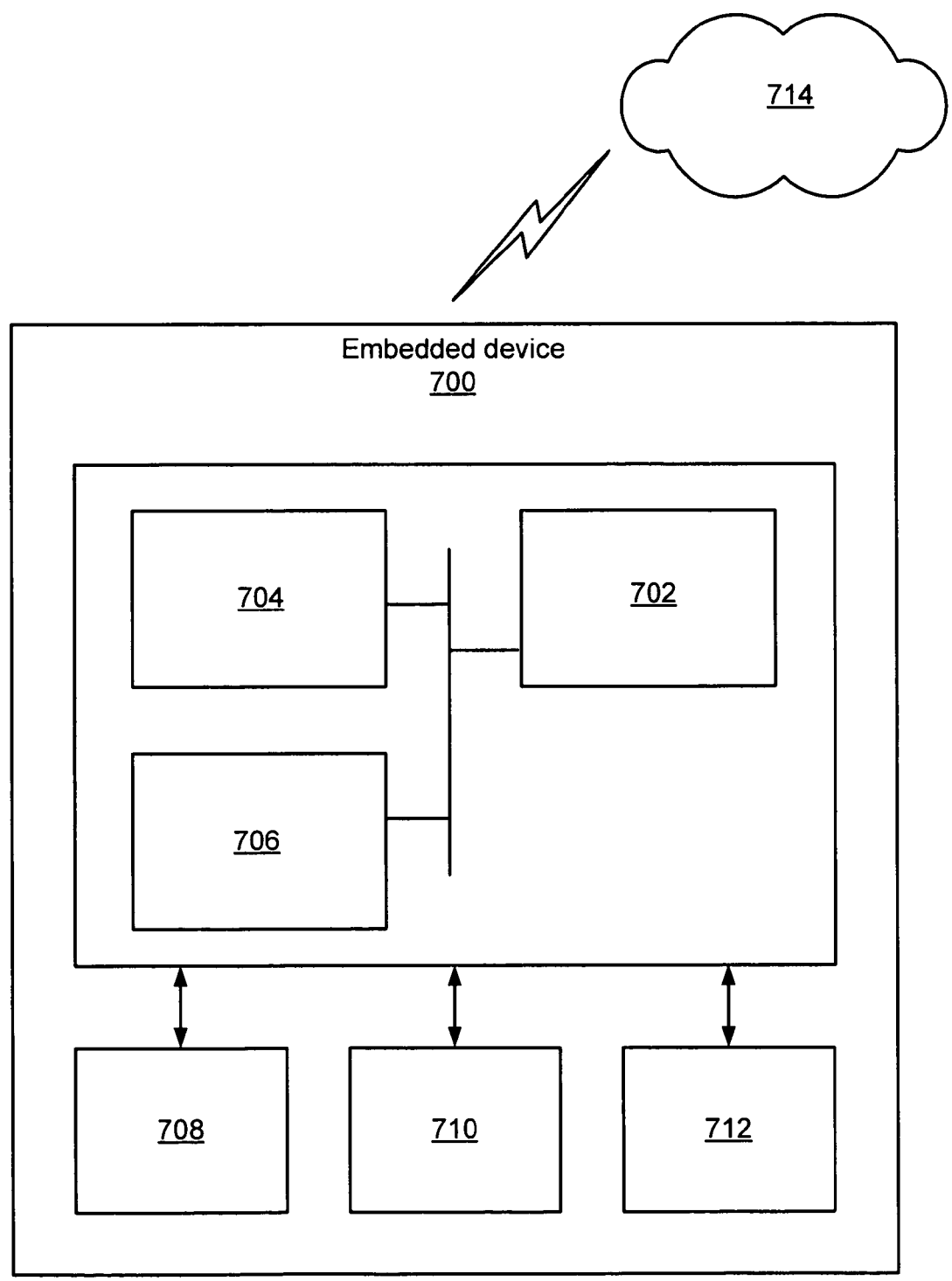
FIG. 7 shows a diagram of an embedded device in accordance with one or more embodiments of the invention.

The invention may be implemented on virtually any type of embedded device regardless of the platform being used. For example, as shown in FIG. 7, an embedded device (700) may include a processor (702), associated memory (704), a storage device (706), and numerous other elements and functionalities typical of today's embedded devices (not shown). The embedded device (700) may also include input means, such as a keypad (708) and/or a touchpad (710), and output means, such as a display panel (712). The embedded device (700) may be connected to a local area network (LAN) or a wide area network (e.g., the Internet) (714) via a network interface connection (not shown). Those skilled in the art will appreciate that these input and output means may take other forms.

Further, the invention may be implemented on a distributed system having a plurality of nodes, where each portion of the invention (e.g., product, embedded device, management console, client, etc.) may be located on a different node within the distributed system. In one embodiment of the invention, the node corresponds to an embedded device. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An embedded device comprising:
 a web interface configured to:
  receive a request for an electronic product information (EPID) report, and
  send the request to a request handling service;
 the request handling service, configured to deploy at least one event handling component based on the request;
 the at least one event handling component configured to:
  generate an EPID event cycle based on an EPID read cycle, according to an event cycle boundary condition,
  generate the EPID report based on the EPID event cycle, and
  transmit the EPID report to a client; and
 a reader adapter configured to:
  obtain the EPID read cycle, and
  transmit the EPID read cycle to the at least one event handling component.

2. The embedded device of claim 1, wherein the at least one event handling component is further configured to:
 obtain an external management message, wherein at least one selected from a group consisting of generating the EPID event cycle, generating the EPID report, and transmitting the EPID report is performed based on the external management message.

3. The embedded device of claim 2, further comprising:
 a management discovery module configured to:
  broadcast availability of the embedded device to obtain the external management message,
  wherein a management console transmits the external management message based on the broadcasted availability; and
 an external connector configured to:
  obtain the external management message from the management console.

4. The embedded device of claim 1, wherein the web interface comprises a servlet written in a Java™ programming language.

5. The embedded device of claim 1, wherein the request handling service and the at least one event handling component comprise classes written in a Java™ Micro Edition programming language.

6. The embedded device of claim 1, wherein the reader adapter comprises a native interface wrapper written in a Java™ programming language.

7. The embedded device of claim 1, wherein the EPID read cycle comprises radio frequency identification (RFID) data.

8. The embedded device of claim 1, wherein the event cycle boundary condition comprises a condition selected from a group consisting of a time interval grouping, an elapsed time period, an external event trigger, and only detecting repeated EPIDs in a specified time period.

9. The embedded device of claim 1, wherein at least one selected from a group consisting of the request, the EPID event cycle, and the EPID report conforms to an Application Level Events (ALE) specification.

10. The embedded device of claim 1, wherein transmitting the EPID report to the client comprises a hypertext transfer protocol (HTTP) communication.

11. A system comprising:
 a client configured to generate a request for an electronic product identification (EPID) report; and
 an embedded device comprising
  a web interface configured to:
   receive the request, and
   send the request to a request handling service;
  the request handling service, configured to deploy at least one event handling component based on the request,
  the at least one event handling component configured to:
   generate an EPID event cycle based on an EPID read cycle, according to an event cycle boundary condition,
   generate the EPID report based on the EPID event cycle, and transmit the EPID report to the client; and
  a reader adapter configured to:
   obtain the EPID read cycle, and
   transmit the EPID read cycle to the at least one event handling component.

12. The system of claim 11, wherein the at least one event handling component is further configured to:
 obtain an external management message, wherein at least one selected from a group consisting of generating the EPID event cycle, generating the EPID report, and transmitting the EPID report is performed based on the external management message.

13. The system of claim 12, further comprising:
 a management console configured to transmit the external management message,
 wherein the embedded device further comprises:
  a management discovery module configured to:
   broadcast availability of the embedded device to obtain the external management message,
   wherein the management console transmits the external management message based on the broadcasted availability; and
  an external connector configured to:
   obtain the external management message from the management console.

14. The system of claim 11, wherein the web interface comprises a servlet written in a Java™ programming language.

15. The system of claim 11, wherein the request handling service and the at least one event handling component comprise classes written in a Java™ Micro Edition programming language.

16. The system of claim 11, wherein the reader adapter comprises a native interface wrapper written in a Java™ programming language.

17. The system of claim 11, wherein the EPID read cycle comprises radio frequency identification (RFID) data.

18. The system of claim 11, wherein the event cycle boundary condition comprises a condition selected from a group consisting of a time interval grouping, an elapsed time period, an external event trigger, and only detecting repeated EPIDs in a specified time period.

19. The system of claim 11, wherein at least one selected from a group consisting of the request, the EPID event cycle, and the EPID report conforms to an Application Level Events (ALE) specification.

20. A computer readable medium comprising executable instructions for generating an electronic product identification (EPID) report by:

broadcasting availability of an embedded device to obtain an external management message, wherein the external management message is transmitted by a management console based on the broadcasted availability;

obtaining the external management message, by the embedded device;

receiving a request for the EPID report, by a web interface in the embedded device, wherein the request conforms to Application Level Events (ALE) specification;

sending the request to a request handling service in the embedded device, deploying at least one event handling component in the embedded device, by the request handling service;

obtaining an EPID read cycle comprising (RFID) data, by a reader adapter in the embedded device;

generating an EPID event cycle based on the EPID read cycle, according to an event cycle boundary condition, wherein the event cycle boundary condition comprises a condition selected from a group consisting of a time interval grouping, an elapsed time period, an external event trigger, and only detecting repeated EPIDs in a specified time period;

generating the EPID report based on the EPID event cycle, by the at least one event handling component; and transmitting the EPID report to a client, wherein at least one selected from a group consisting of generating the EPID event cycle, generating the EPID report, and transmitting the EPID report is performed based on the external management message.

\* \* \* \* \*

UNITED STATES PATENT AND TRADEMARK OFFICE
CERTIFICATE OF CORRECTION

| | | |
|---|---|---|
| PATENT NO. | : 7,726,567 B2 | Page 1 of 1 |
| APPLICATION NO. | : 11/586753 | |
| DATED | : June 1, 2010 | |
| INVENTOR(S) | : James B. Clarke et al. | |

It is certified that error appears in the above-identified patent and that said Letters Patent is hereby corrected as shown below:

In column 2, line 58, delete "EPGglobal" and insert -- EPCglobal --, therefor.

In column 11, line 60, in claim 3, delete "console," and insert -- console. --, therefor.

Signed and Sealed this
Nineteenth Day of July, 2011

David J. Kappos
*Director of the United States Patent and Trademark Office*